United States Patent
Yamamoto et al.

(10) Patent No.: US 7,194,196 B2
(45) Date of Patent: *Mar. 20, 2007

(54) INFORMATION RECORD MEDIUM, AND APPARATUS FOR AND METHOD OF REPRODUCING THE SAME

(75) Inventors: Kaoru Yamamoto, Tsurugashima (JP); Takao Sawabe, Tokyo-to (JP); Hidehiro Ishii, Tokorozawa (JP); Shozo Ema, Tokorozawa (JP); Tokihiro Takahashi, Kawagoe (JP)

(73) Assignee: Pioneer Corporation, Tokyo-To (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/200,430

(22) Filed: Nov. 27, 1998

(65) Prior Publication Data
US 2002/0181937 A1 Dec. 5, 2002

(30) Foreign Application Priority Data
Nov. 28, 1997 (JP) ............................ P9-328010

(51) Int. Cl.
*H04N 5/781* (2006.01)
(52) U.S. Cl. .................. 386/125; 386/95; 386/96
(58) Field of Classification Search ............ 386/39, 386/45, 95–96, 101, 104–106, 125–126, 386/12
See application file for complete search history.

(56) References Cited

U.S. PATENT DOCUMENTS

| | | | | |
|---|---|---|---|---|
| 4,777,537 A | * | 10/1988 | Ueno et al. ................ | 386/101 |
| 5,987,417 A | * | 11/1999 | Heo et al. .................. | 386/96 |
| 6,125,232 A | * | 9/2000 | Taira et al. ................. | 386/95 |
| 6,198,874 B1 | * | 3/2001 | Kaneshige et al. ......... | 386/125 |
| 6,249,641 B1 | | 6/2001 | Yokota | |
| 6,741,796 B1 | * | 5/2004 | Heo ........................... | 386/95 |

FOREIGN PATENT DOCUMENTS

| | | |
|---|---|---|
| EP | 0 635 835 A | 1/1995 |
| EP | 0 696 798 A | 2/1996 |
| EP | 0 714 098 A | 5/1996 |
| EP | 0817195 A2 | 2/1998 |
| EP | 0 856 849 A | 8/1998 |
| EP | 0 867 877 A | 9/1998 |
| EP | 0 892 404 A | 1/1999 |
| EP | 0 896 335 A | 2/1999 |
| EP | 0 918 331 A | 5/1999 |
| EP | 0 918 332 A | 5/1999 |
| GB | 2 225 147 * | 5/1990 |
| GB | 296 19 764 | 1/1997 |
| JP | HEI. 9-259572 | 10/1997 |

* cited by examiner

*Primary Examiner*—James J. Groody
*Assistant Examiner*—Christopher Onuaku
(74) *Attorney, Agent, or Firm*—Drinker Biddle & Reath LLP

(57) ABSTRACT

An information record medium is provided with: substantial information including video information and audio information which are related to each other; first reproduction control information to simultaneously reproduce the video information and the audio information out of the substantial information; and second reproduction control information to reproduce only the audio information out of the substantial information.

23 Claims, 11 Drawing Sheets

INFORMATION RECORD MEDIUM, AND APPARATUS FOR AND METHOD OF REPRODUCING THE SAME

BACKGROUND OF THE INVENTION

1. Field of the Invention

The present invention relates to an information record medium, and more particularly relates to a reproduction of audio information from a video DVD.

2. Description of the Related Art

There is a video DVD (i.e., a disc based on a DVD-Video standard) as a record medium for recording video information such as a movie since it has a large memory capacity.

On the other hand, there is an audio DVD (i.e., a disc based on a DVD-audio standard) as a record medium for not recording the video information such as a movie but recording audio information such as music. It is possible to record onto just one audio DVD the audio information corresponding to a plurality of CDs (Compact Discs) since it has a large memory capacity as a DVD. Further, it is also possible to record the audio information corresponding to a music CD of a soundtrack version of a movie in addition to the video information such as a movie.

The above mentioned video DVD is reproduced by a video DVD player (i.e., a player for outputting video and audio), while the above mentioned audio DVD is reproduced by an audio DVD player (i.e., a player for outputting just audio). However, a conventional video DVD player cannot reproduce a disc recorded by the audio DVD format, while the audio DVD player cannot reproduce a conventional video DVD recorded by the video DVD format.

In case that only the audio information out of the record information is to be reproduced from the video DVD, which has been recorded with a primary purpose of reproducing the video information (e.g., in case that only the audio information is to be reproduced from the video disc on which a live performance of a certain singer has been recorded), or in case that the video DVD is to be reproduced by use of the audio DVD compatible player, a simple reproduction of the recorded audio information may be inadequate. Therefore, in case that only the audio information is to be reproduced from the video DVD, it is necessary to perform a reproduction control which is different from that for a normal video DVD.

SUMMARY OF THE INVENTION

It is therefore an object of the present invention to provide an information record medium, on which video information is recorded such as a video DVD and which allows an audio DVD compatible player to reproduce only the audio information therefrom without discrepancy, and an apparatus for and a method of appropriately reproducing only the audio information from the video DVD.

The above object of the present invention can be achieved by an information record medium provided with: substantial information including video information and audio information which are related to each other; first reproduction control information to simultaneously reproduce the video information and the audio information out of the substantial information; and second reproduction control information to reproduce only the audio information out of the substantial information.

According to the information record medium of the present invention, a reproducing apparatus, which is capable of reproducing both of the video information and the audio information, reproduces both of them on the basis of the first reproduction control information. On the other hand, a reproducing apparatus, which is capable of only reproducing the audio information, reproduces only the audio information on the basis of the second reproduction control information. Therefore, in accordance with the capability of the reproducing apparatus, it is possible to reproduce the same information record medium.

In one aspect of the information record medium, the first reproduction control information and the second reproduction control information prescribe a reproduction of a same portion of the substantial information.

According to this aspect, it is possible to reproduce the same portion of the substantial information by two different ways.

In another aspect of the information record medium, the first reproduction control information divides the substantial information into a plurality of first information units and prescribes a reproduction control of the first information units, and the second reproduction control information divides the substantial information into a plurality of second information units, which are different from the first information units, and prescribes a reproduction control of the second information units.

According to this aspect, it is possible to prescribe the reproduction control information on the basis of the different information units in correspondence with the content of the video information and the audio information included in the substantial information, so that it is possible to reproduce the same substantial information in various manners.

In another aspect of the information record medium, the second reproduction control information prescribes a reproduction of the substantial information in a reproduction order, which is different from that of the first reproduction control information, with respect to a same portion of the substantial information.

According to this aspect, it is possible to prescribe the reproduction control information in different orders in correspondence with the content of the video information and the audio information included in the substantial information, so that it is possible to reproduce the same substantial information in various manners.

In another aspect of the information record medium, the information record medium is further provided with another substantial information including only audio information.

According to this aspect, it is possible to reproduce the audio information from both of the substantial information including the video information and the substantial information only including the audio information.

The above object of the present invention can be also achieved by a first information reproducing apparatus for reproducing the above described information record medium of the present invention. The first information reproducing apparatus is provided with: a reading device for reading the substantial information, the first reproduction control information and the second reproduction control information from the information record medium; and a reproducing device for reproducing the substantial information in accordance with the first reproduction control information when a reproduction of the video information and the audio information is instructed, and reproducing the substantial information in accordance with the second reproduction control information when a reproduction of only the audio information is instructed.

The above object of the present invention can be also achieved by a second information reproducing apparatus for reproducing the above described information record medium of the present invention. The second information reproducing apparatus is provided with: a reading device for reading the substantial information and the first reproduction control information from the information record medium; and a reproducing device for reproducing the substantial information in accordance with the first reproduction control information when a reproduction of the video information and the audio information is instructed.

The above object of the present invention can be also achieved by a third information reproducing apparatus for reproducing the above described information record medium of the present invention. The third information reproducing apparatus is provided with: a reading device for reading the substantial information and the second reproduction control information from the information record medium; and a reproducing device for reproducing the substantial information in accordance with the second reproduction control information when a reproduction of only the audio information is instructed.

The above object of the present invention can be also achieved by a first information reproducing method for reproducing the above described information record medium of the present invention. The first information reproducing method is provided with: a reading process for reading the substantial information, the first reproduction control information and the second reproduction control information from the information record medium; and a reproducing process for reproducing the substantial information in accordance with the first reproduction control information when a reproduction of the video information and the audio information is instructed, and reproducing the substantial information in accordance with the second reproduction control information when a reproduction of only the audio information is instructed.

The above object of the present invention can be also achieved by a second information reproducing method for reproducing the above described information record medium of the present invention. The second information reproducing method is provided with: a reading process for reading the substantial information and the first reproduction control information from the information record medium; and a reproducing process for reproducing the substantial information in accordance with the first reproduction control information when a reproduction of the video information and the audio information is instructed.

The above object of the present invention can be also achieved by a third information reproducing method for reproducing the above described information record medium of the present invention. The third information reproducing method is provided with: a reading process for reading the substantial information and the second reproduction control information from the information record medium; and a reproducing process for reproducing the substantial information in accordance with the second reproduction control information when a reproduction of only the audio information is instructed.

According to each of the first to third information reproducing apparatuses and each of the first to third information reproducing methods of the present invention as described above, the video information and the audio information, or only the audio information can be selectively reproduced from a same information record medium, so that the user can reproduce the same information record medium by a plurality of reproducing methods. Especially, according to each of the second information reproducing apparatus and the second information reproducing method, it is possible to perform the audio reproduction by the video DVD player without discrepancy in the same manner as the audio DVD. Also, according to each of the third information reproducing apparatus and the third information reproducing method, it is possible to reproduce the audio information of the video DVD without discrepancy by the audio DVD player.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

(1) Format of Video DVD

First of all, a record format on a video DVD of video information and audio information (which includes music information, hereinbelow) is explained.

(1-A) Physical Format of Video DVD

A physical format of the record format on the video DVD is explained with reference to FIG. 1.

Figure 1:
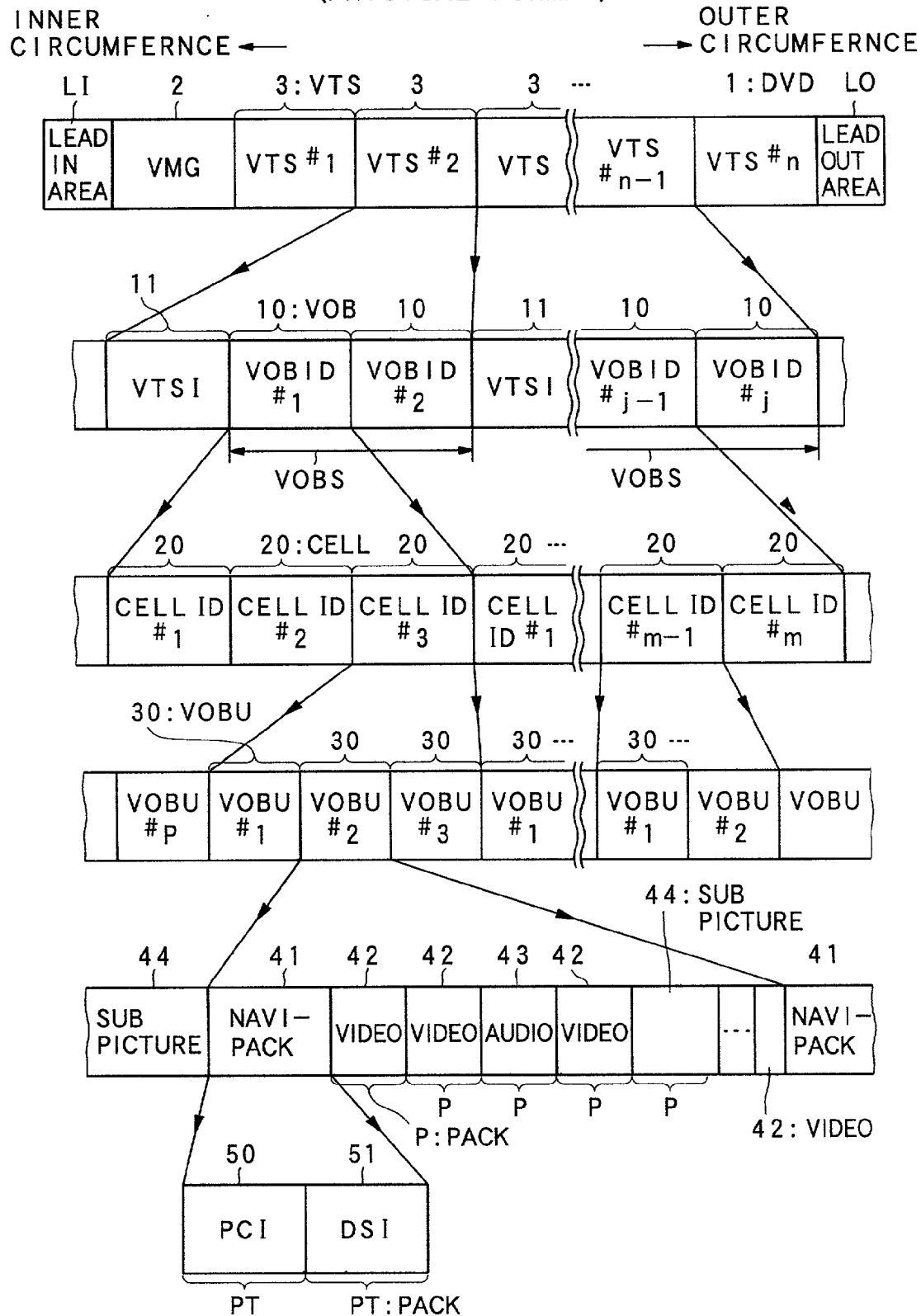
FIG. 1 is a diagram showing a physical structure (physical format) of record information of a video DVD.

As shown in FIG. 1, a video DVD 1 is provided with a lead in area LI at its most inner circumferential portion and a lead out area LO at its most outer circumferential portion, between which video information and audio information are recorded such that they are divided into a plurality of VTSs (Video Title Sets) 3, each of which has a unique ID (Identification) number (i.e. VTS#1 to VTS#n). Here, the VTS 3 is a set (bundle) of titles (each of which is one production or one work which an author or producer intends to offer to the audience), which are related to each other (e.g., attributes, such as the number, the specification, the corresponding languages etc. of the audio information and the video information included therein are the same to each other). Ahead of the area where the VTSs 3 are recorded, a VMG (Video Manager) 2 is recorded. As the information recorded in the video manager 2, for example, information related to the whole video and audio information recorded on the video DVD 1, such as a menu for showing a name of each title, information for preventing an illegal copy, an access table for directly accessing each title and so on, is recorded.

One VTS 3 is recorded such that it is divided into a plurality of VOBs (Video Objects) 10, each of which has an ID number (VOB ID#1, VOB ID#2, . . . ), and VTSI (Video Title Set Information) 11 disposed ahead of the VOBs 10. Here, a data portion constructed by a plurality of VOBs 10 is defined as a VOB set (VOBS) as shown in FIG. 1.

In the VTSI 11 recorded at the head of the VTS 3, information such as PGCI (ProGram Chain Information), which is various information related to a program chain as a logical division obtained by combining a plurality of cells (the "cell" will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an ID number (cell ID#1, cell ID#2, . . . ). One cell 20 is constructed of a plurality of VOB units (VOBUs) 30, each of which has an ID number (VOBU#1, VOBU#2, . . . ). Here, the VOB unit 30 is an information unit, each of which includes the video information, the audio information and sub picture information (which is defined as information of a sub picture such as a subtitle of a movie etc.), or only includes a navi-pack which is described layer.

One VOB unit 30 is provided with: a navi-pack (a navigation pack) 41 for storing various control data whose control object is the video information etc. included in the VOBU 30; a video pack 42 for storing video data as the video information; an audio pack 43 for storing audio data as the audio information; and a sub picture pack 44 for sub picture data as the sub picture information. Here, in the video pack 42, only the video information is recorded. In the audio pack 43, only the audio data is recorded. Further, in the sub picture pack 44, only the sub picture data which are graphic data such as a character and a diagram as the sub picture is recorded.

In a pack header recorded at the head of each pack P, a reading-start time information so-called as a SCR (System Clock reference), which indicates a reading-start time on a reproduction time axis to start reading the data included in each pack P from a track buffer of a reproducing apparatus described layer and inputting it into respective one of buffers, a start code indicating a start of each pack P and the like are recorded.

Finally, the navi-pack 41 is provided with: a DSI (Data Search Information) packet 51 including search information to search a video image or an audio sound desired to be displayed or sound-outputted (concretely, search information such as an address, where the video or audio to be displayed or sound-outputted is recorded, on the DVD 1); and a PCI (Presentation Control Information) packet 50 including information related to a display control at a time of displaying the video image or outputting the audio sound, which is searched on the basis of the information of the DSI packet 51.

Each video pack 42 included in one VOB unit 30 consist of at least one GOP (Group Of Pictures). The GOP is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

In the above explained record format having a hierarchical structure as shown in FIG. 1, each division can be freely set according to the author's intention, so as to perform recording on the basis of these set divisions. By performing the reproduction on the basis of a later described logical structure for each of these divisions, the variegated reproduction can be performed.

(1-B) Logical Format

Nextly, a logical format (logical structure) constructed by combining the information recorded by the physical divisions shown in FIG. 1 is explained with reference to FIG. 2. The information is not actually recorded on the DVD 1 in the logical structure of FIG. 2. Instead, information (e.g. access information or time information) to reproduce each data shown in FIG. 1 by combining them (especially combining the cells 20) in the logical structure shown in FIG. 2, is recorded on the DVD 1, especially in the VTSI 11.

Figure 2:
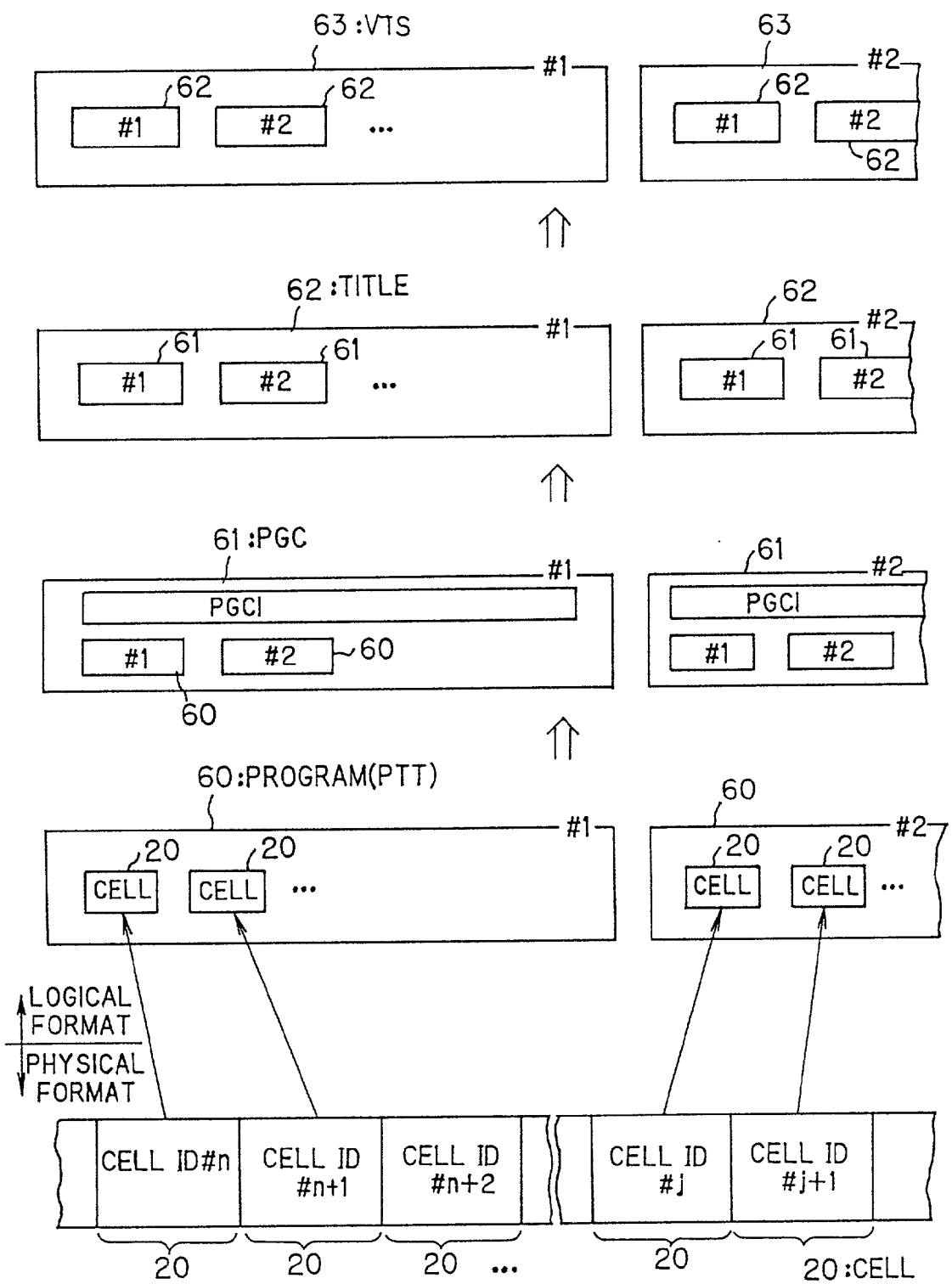
FIG. 2 is a diagram showing a logical structure (logical format) of the record information of the video DVD in FIG. 1.

To make the explanation clear, the following explanation is made from the lower hierarchical layer in FIG. 2. One program 60 is logically constructed on the basis of the author's intention by selecting and combining a plurality of cells 20 among the physical structures explained by use of FIG. 1. It is also possible for the author to define a gathering of one or more programs 60 as a minimum unit, which can be freely selected to be watched or listened to by the audience and which is referred to as a PTT (ParT of Title).

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 2, the number is treated as the cell number in the order of description in the PGCI described later.

Next, by combining a plurality of programs 60, one PGC (Program Chain) 61 is logically constructed. The aforementioned PGCI (ProGram Chain Information) is defined by a unit of the PGC 61. The PGCI includes information indicating: the reproduction order of the cells 20 for each program 60 at a time of reproducing each program 60 (by this reproduction order, a unique program number (#1, #2, . . . ) is assigned to each program 60); an address which is a record position of each cell 20 on the DVD 1; the number of the cell 20 positioned at the head of one program 60 to be firstly reproduced; and so on.

In one PGC 61, the substantial video and audio data etc. are included as a combination of the programs 60 (in other words, the combination of the cells 20) other than the above mentioned PGCI.

Then, one title 62 is logically constructed of one or a plurality of PGCs 61 (PGC #1, PGC#2, . . . ) as shown in FIG. 2. The title 62 is, for example, a unit corresponding to one movie, and is completed information which the author would like to offer to the audience of the DVD 1.

Finally, one VTS 63 is logically constructed of one or a plurality of titles 62 (title #1, title #2, . . . ) as shown in FIG. 2. The information included in one VTS 63 shown in FIG. 2 corresponds to information included in one VTS 3 shown in FIG. 1. Namely, all information included in the logical VTS 63 shown in FIG. 2 is recorded as one VTS 3 in the DVD 1 shown in FIG. 1.

As the author specifies the information divided in the physical structure on the DVD 1 on the basis of the above described logical format, the video image and/or the music for the audience to watch and/or listen to is to be formed.

(2) Format of Audio DVD

Next, a record format on an audio DVD of audio information (which includes audio and voice information, hereinbelow) is explained.

(2-A) Physical Format of Audio DVD

A physical format of the record format on the audio DVD is explained with reference to FIG. 3.

Figure 3:
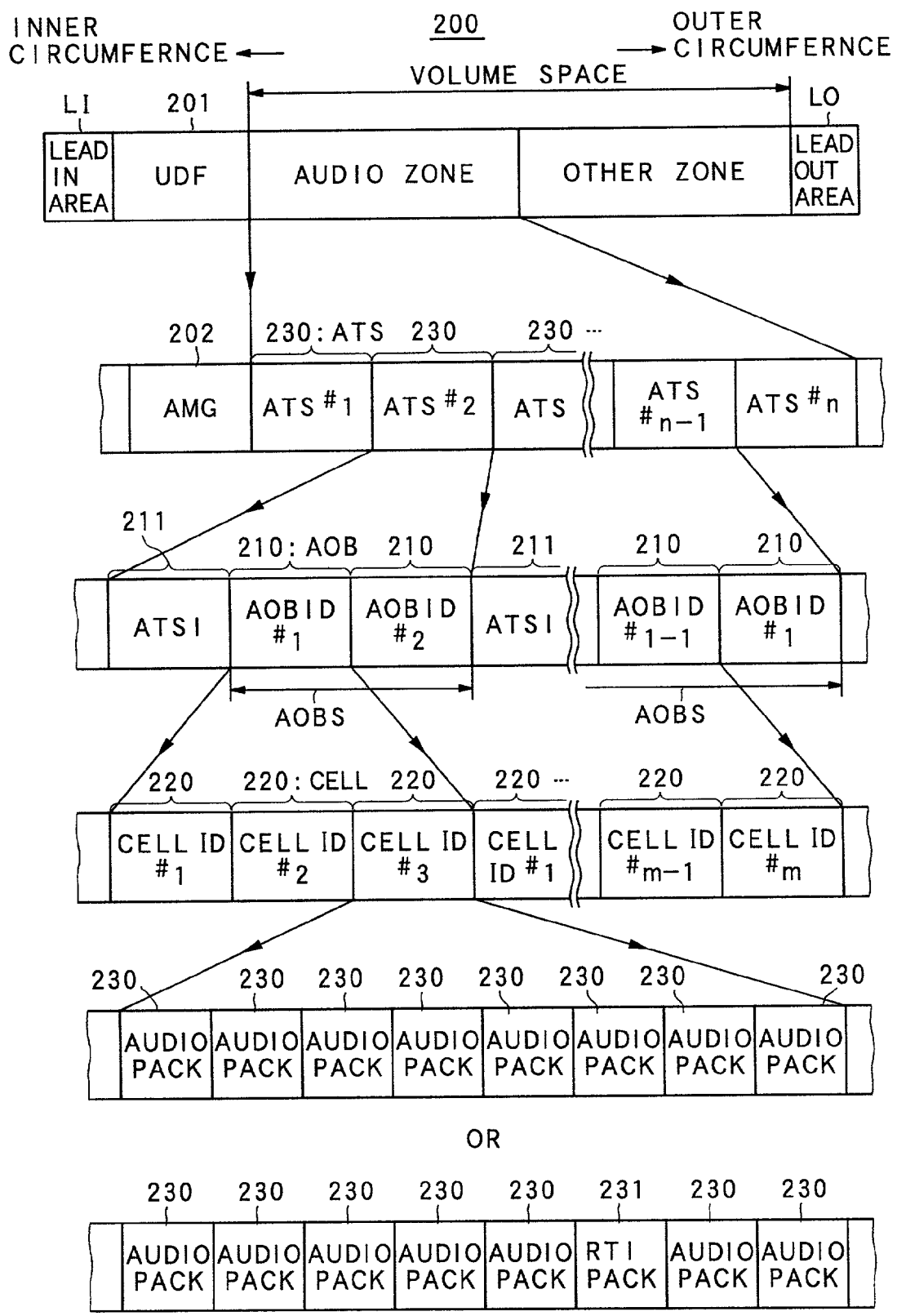
FIG. 3 is a diagram showing a physical structure (physical format) of record information of an audio DVD.

As shown in FIG. 3, an audio DVD 200 as an embodiment is provided with the lead in area LI at its most inner circumferential portion and the lead out area LO at its most outer circumferential portion, between which one volume space is recorded. Within the volume space, an audio zone is always recorded. In this audio zone, the audio information is recorded such that it is divided into a plurality of ATSs (Audio Title Sets) 230, each of which has a unique ID (Identification) number (i.e. ATS#1 to ATS#n).

At the outer circumference side of the lead in area LI, a UDF (User Disc Format) 201 for managing the format of the file recorded on the audio DVD 200 is recorded, and, next to it, an AMG (Audio Manager) 202 is recorded. As the information recorded in the AMG 202, for example, information related to the whole audio information recorded on the audio DVD 200, such as a menu for showing a name of each item, information for preventing an illegal copy, an access table for directly accessing each title and so on, is recorded.

One ATS 203 is recorded such that it is divided into a plurality of AOBs (Audio Objects) 210, each of which has an ID number (AOB ID#1, AOB ID#2, . . . ), and ATSI (Audio Title Set Information) 211 disposed ahead of the AOBs 210.

Here, a data portion constructed by a plurality of AOBs 210 is defined as an AOB set (AOBS) as shown in FIG. 3. The AOB set is the substantial portion of the audio information, while the ATS 211 is the managing and controlling information of the AOB set consisting of a plurality of AOBs 210.

In the ATSI 211 recorded at the head of the ATS 203, information such as APGCI (Audio ProGram Chain Information), which is various information related to a program chain as a logical division obtained by combining a plurality of cells (the "cell" will be described later in detail), is recorded. In each AOB 210, the substantial portion of the audio information (i.e. the audio information itself other than control information) besides the control information is recorded.

One cell 220 consists of a plurality of audio packs 230 each of which has been packed, or an audio pack 230 and real time information pack 231. The audio pack 230 is a data pack into which the audio information to be recorded onto the audio DVD has been packed by each predetermined size, and includes audio information digitized by a linear PCM for example. In the real time information pack 231, text information, BPM (Beat Per Minutes) information, hand clap information and the like are included.

In the above explained record format having a hierarchical structure as shown in FIG. 3, each division can be freely set according to the author's intention, so as to perform recording the record information onto the audio DVD 200 on the basis of these set divisions. By performing the reproduction on the basis of a later described logical structure for each of these divisions, the variegated reproduction can be performed.

(2-B) Logical Format

Nextly, a logical format (logical structure) constructed by combining the information recorded by the physical divisions shown in FIG. 3 is explained with reference to FIG. 4.

Figure 4:
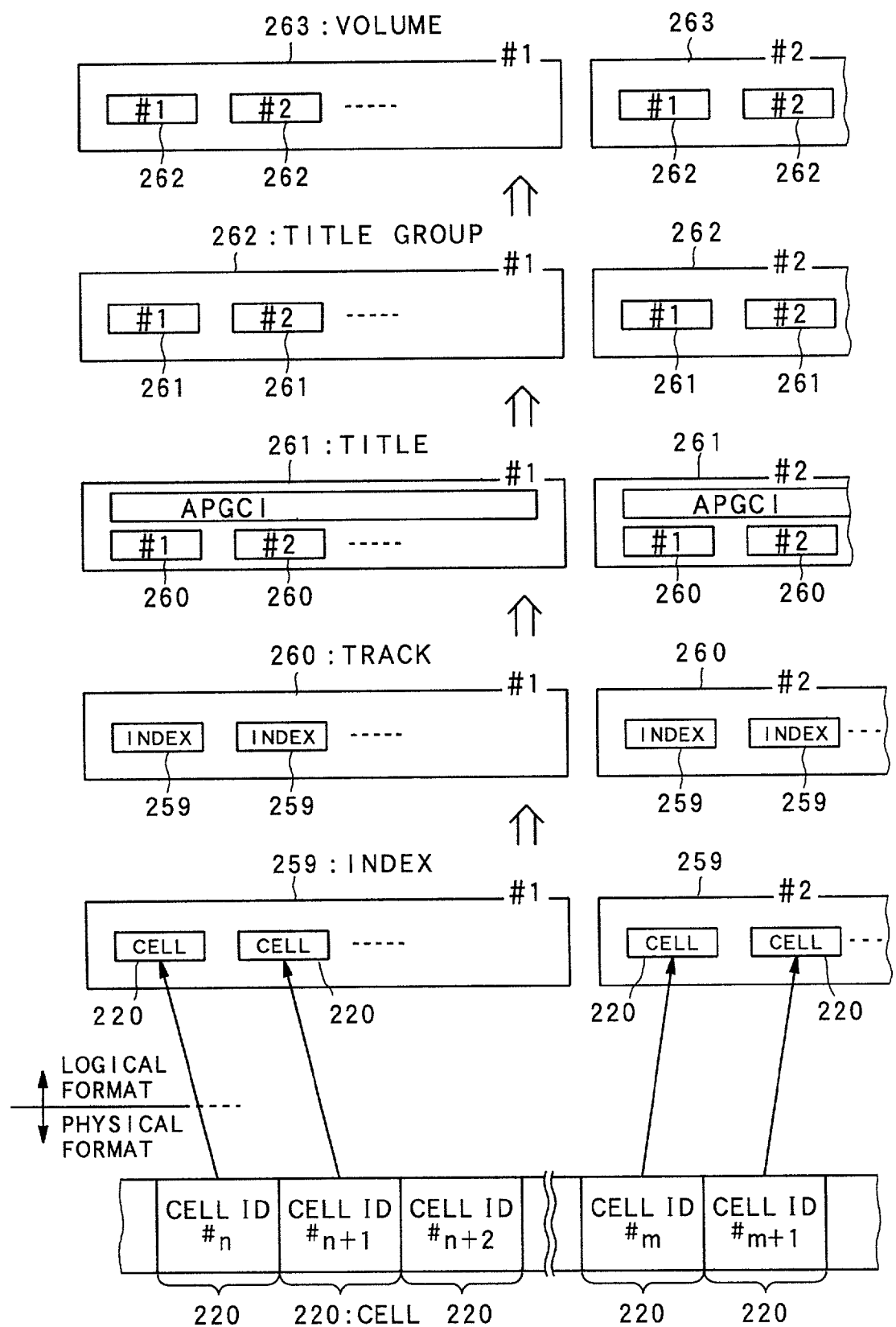
FIG. 4 is a diagram showing a logical structure (logical format) of the record information of the audio DVD in FIG. 3.

The information is not actually recorded on the audio DVD 200 in the logical structure of FIG. 4. Instead, the audio information is recorded on the audio DVD in the physical format shown in FIG. 3, and the information to reproduce the audio information is recorded in the aforementioned AMG 202 and the ATSI 211 in the logical format shown in FIG. 4.

To make the explanation clear, the following explanation is made from the lower hierarchical layer in FIG. 4. An index 259 is constructed by selecting and combining one cell 220 or a plurality of cells 220 among the physical structure explained with reference to FIG. 3. The index 259 can be used as the music number, and is the minimum unit which can be accessed by the user.

By one or a plurality of indexes 259, one track 260 is logically constructed. The track 260 is an information unit corresponding to one music composition. The user can select an arbitrary track (music composition) and directly access it.

Here, as for the number of each cell 220, at a time of treating the cell 220 on the physical format shown in FIG. 3, the number is treated as the cell ID number (which is indicated by cell ID # in FIG. 3). On the other hand, at a time of treating the cell 220 on the logical format shown in FIG. 4, the number is treated as the cell number in the order of description in the APGCI described later.

The track (music composition) 260 is an information unit including a plurality of cells, and is a group of cells having certain common attributes to each other. Namely, the attributes of all of the cells in one track 260 are the same to each other. Further, all of the cells included in the track 260 are recorded adjacent to each other within the same object.

One title 261 is logically constructed of one track 260 or a plurality of tracks 260. However, the title 261 itself is not recognized as a unit of access by the user. Therefore, it is not possible to access an arbitrary title by specifying the title number.

In case of the audio DVD, the attribute of each track 260 constructing the title 261 can be defined independently within 8 patterns at the maximum. Namely, the attribute as the audio information such as the channel number, the quantization method, the sampling frequency and the like may be changed for each track (i.e., each music composition).

The aforementioned APGCI is defined by the unit of this title 261. In the APGCI, the attribute of each track 260, the reproduction order of the cells 220 in each track 260 when reproducing each track 260, the address which is the recording position of each cell 220 on the audio DVD 220, the number of the cell 220 at the head to be reproduced on one track 260, the reproducing method of each track 260 and various commands are included.

In one title 261, the substantial audio information is included as the combination of the tracks 260 (i.e., the combination of the cells 220) other than the above mentioned APGCI.

One title group 262 is logically constructed by one or a plurality of titles 261. The title group 262 is the maximum unit which the user can access, and can be defined up to 9 groups at the maximum within one volume. This title group 262 is constructed by one or a plurality of titles 261 which are collected on the basis of a certain relationship, and all of the titles 261 within the title group 262 are continuously reproduced. For example, it is possible to collect as one title group the music compositions of a particular singer, a particular composer or the like.

One volume 262 is logically constructed by one or a plurality of title groups 262. The volume 262 is an information unit corresponding to one album (DVD).

The actual audio information included in one title shown in FIG. 4 is recorded within one ATS 203 shown in FIG. 3 on the audio DVD.

As the author specifies the information divided in the physical structure on the audio DVD 200 on the basis of the above described logical format, the music for the audience to listen to is to be formed.

(3) Kinds of DVDs

Next, the kinds of the DVDs will be explained with reference to FIG. 5.

At the present, there exist 4 kinds of discs as the DVD.

① video DVD
② video DVD provided with audio navigation (corresponding to the present invention)
③ audio only DVD
④ audio and video DVD (video portion of which is the object of the present invention)

Incidentally, the disc shapes and the information recording methods (e.g., the modulation methods, the track pitches, the pit sizes-etc.,) are the same to each other between there 4 kinds of discs, and only the contents of these 4 kinds of discs are different from each other.

Figure 5:
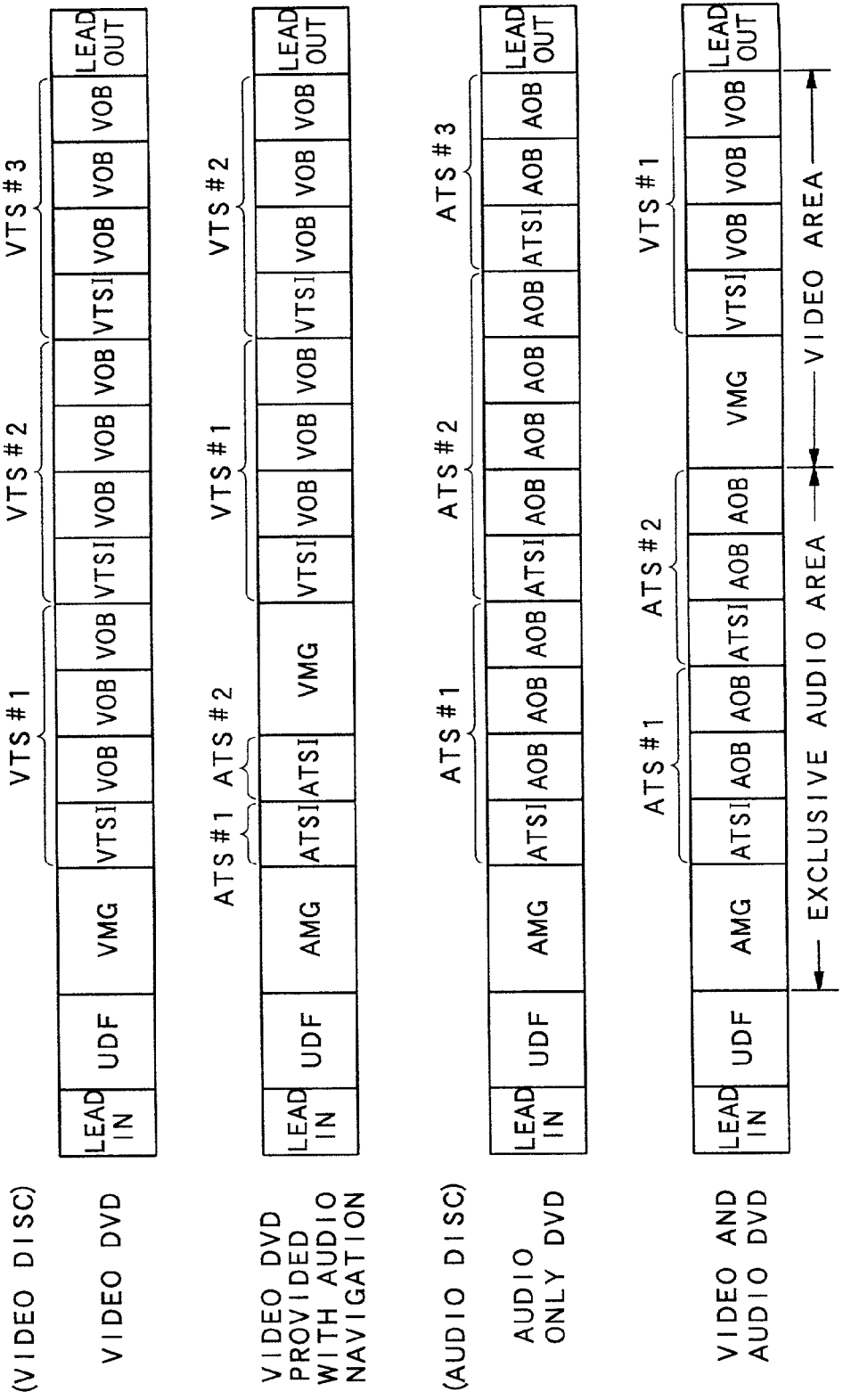
FIG. 5 is a diagram showing various kinds of DVDs.

FIG. 5 schematically shows the physical formats of these 4 kinds of the DVDs.

The video DVD is shown at the top stage of FIG. 5. On this video DVD, the video information and the audio information to be simultaneously reproduced such as a movie are recorded. Therefore, on the recording area between the lead in area LI and the lead out area LO, the video information and the audio information within a plurality of the VTSs are recorded other than the management information, and that the VMG including the managing/controlling information for these VTSs is also recorded. As explained before with reference to FIG. 1, the video information is recorded as the video pack and the audio information is recorded as the audio pack.

The video DVD provided with audio navigation as one kind of video discs is shown at the second top stage of FIG. 5, which enables a reproduction of the video information (including the audio information accompanying it) such as a movie in the same manner as the mere video DVD, and which also enables the reproduction of only the audio information within the record information by the audio DVD player. This one portion of the record information which can be reproduced by the audio DVD player is called as an "audio play part". As for the recording format thereof, the video information is recorded in the form of a plurality of VTSs in conformity to the video DVD shown in FIG. 1. In addition to it, on the video DVD provided with the audio navigation, the AMG including the reproduction controlling information to reproduce only the audio information within the recorded VTS and the ATSI as the reproduction controlling information (hereinbelow, it is referred to as an "audio navigation information") are recorded, but the AOB which is the substantial portion of the audio information is not recorded. Namely, in these AMG and ATSI, the navigation information for the audio information (more concretely, the audio pack within each VOB (refer to FIG. 1)) included in each VTS within the video DVD provided with the audio navigation is recorded.

The audio only DVD is shown at the third top stage of FIG. 5. On this disc, only the audio information except for a little amount of still pictures is recorded. Therefore, in the record area between the lead in area LI and the lead out area LO, the audio information is recorded as a plurality of ATSs other than the managing information, and that the AMG including the managing/controlling information for these ATSs is also recorded. Further, one or a plurality of AOBs as the substantial portion of the audio information are included in each ATS.

The audio and video DVD is shown at the bottom stage of FIG. 5, which enables not only the reproduction of the audio information accompanied with the video reproduction by the video DVD player, in the same manner as the video DVD provided with the audio navigation, but also the reproduction of only the audio information of the audio play part by the audio DVD player. However, the point different from the video DVD provided with the audio navigation is that the record area of the disc is divided into the audio area to which only the audio information is recorded and the video area to which the video information is recorded, and that the navigation information in the audio area and the navigation information in the video area which are different from each other are recorded.

In more detail, in case of the video DVD provided with the audio navigation, the audio information is recorded such that it is included in the VOB recorded on the basis of the video DVD format as aforementioned and is recorded together with the video information. Then, in order to reproduce only the audio information of the audio play part within the VOB, the navigation information for the audio information recorded within the VOB is prepared within the ATSI as the APGCI in the aforementioned audio DVD, and is managed by the AMG. Therefore, the video DVD provided with the audio navigation is basically such a disc that the navigation information to reproduce only the audio information of the audio play part included in the video DVD is added to the video DVD.

In contrast to this, in the audio and video DVD, there are the audio area to which the audio information is recorded in conformity to the audio DVD format, and the video area to which the video is recorded in conformity to the video DVD format. Within the audio area, only the audio information is recorded by the format based on the audio DVD shown in FIG. 3. Namely, the substantial portion of the audio information is recorded as a plurality of ATSs. The ATSI including the navigation information for the substantial audio information in each ATS is also recorded, and is managed by the AMG. Namely, in the audio area, the audio information is recorded in accordance with the audio DVD format explained with reference to FIG. 3 and FIG. 4.

On the other hand, in the video area, the video information (which includes the audio information accompanying to it) is recorded as a plurality of VTSs. The VTSI including the navigation information for the substantial information in each VTS is also recorded, and is managed by the VMG. Namely, in the video area, the video information (including the audio information accompanying to it) is recorded in accordance with the video DVD format explained with reference to FIG. 1 and FIG. 2.

From this audio and video DVD, the video information (including the audio information accompanying to it) is reproduced according to the VMG and the VTSI within the video area in case of reproducing the video information by use of the video DVD player.

When the audio information is reproduced by the audio DVD player from the audio and video DVD, there are two cases. Namely, one case is that the audio information within the AOB is reproduced according to the ATSI which is the navigation information within the ATS and the AMG in the audio area in the same manner as the audio DVD. Another case is that the audio information of the audio play part recorded in the VTS within the video area is reproduced according to the AMG and the ATSI. In other words, upon reproducing the video information in the video area of the audio and video DVD, the video and audio are reproduced in the same manner as the conventional video DVD by the video DVD player with respect to the same work while only the audio information of the audio play part is reproduced by the audio DVD player. The concrete reproducing method thereof will be described later.

(4) Double Management for the Same Object

Next, the double management for the same object is explained. Here, the object indicates the substantial information such as the video information, the audio information etc., or the like recorded on the DVD. The double management means managing those objects on the basis of two ways of navigation information so as to reproduce it.

Hereinbelow, the double management will be explained with taking an example of the aforementioned video DVD provided with the audio navigation.

Figure 6:
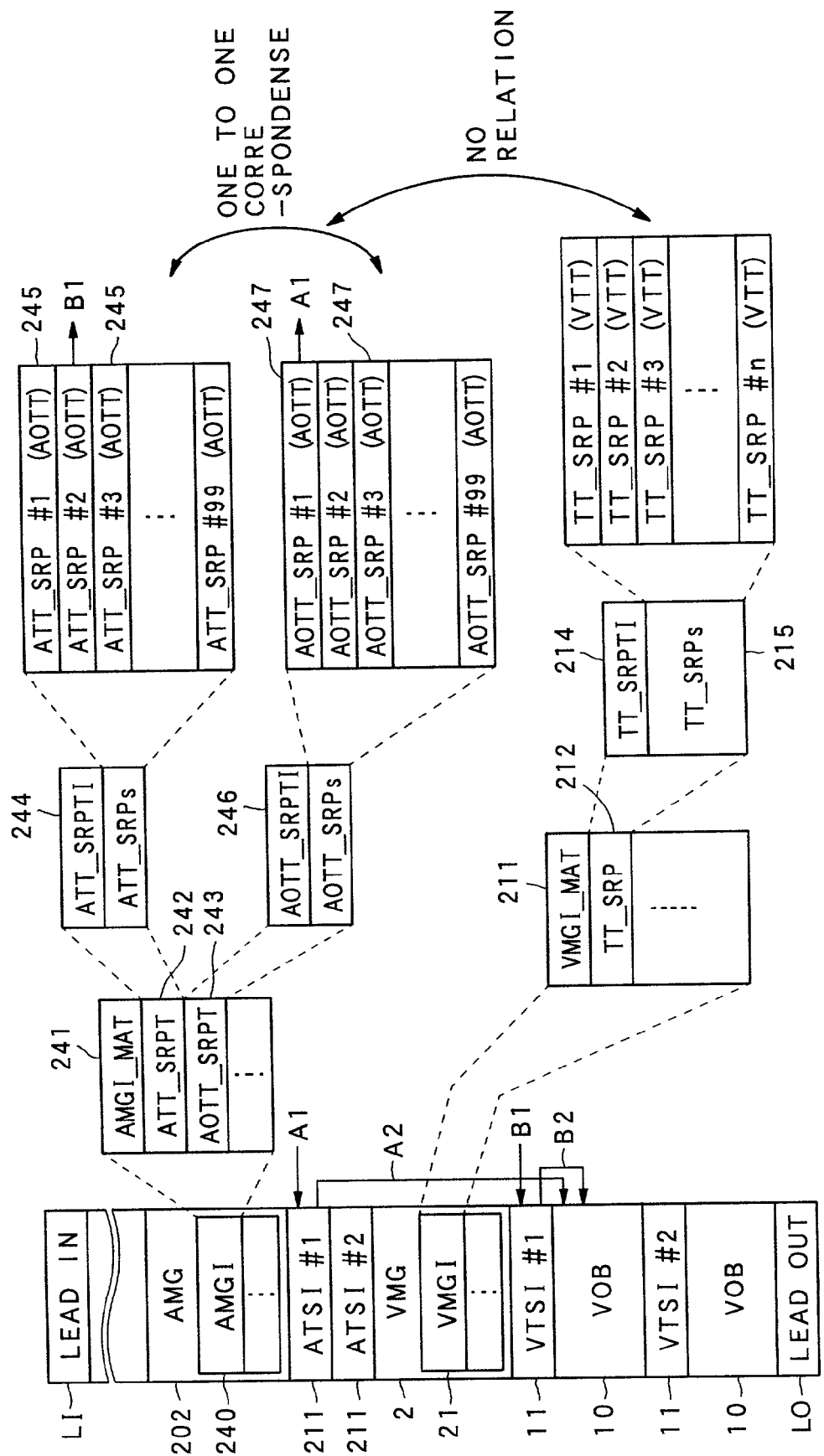
FIG. 6 is a diagram showing a physical format of a video DVD provided with an audio navigation, and navigation information included therein.

In FIG. 6, the physical format of the video DVD provided with the audio navigation and the navigation information included in it are indicated. As aforementioned, the video DVD provided with the audio navigation has the physical recording format in which the navigation information to reproduce only the audio information is added to the record information of the video DVD. Namely, the video DVD provided with the audio navigation has the ATSI 211 which is the navigation information of the audio information included in the VTS 3 and the AMG 202 which is the management information thereof in addition to the VOB 10 which is the substantial portion of the video information, the VTSI 11 which is the reproduction controlling information thereof and the VMG 2 which is the managing information. However, different from the audio only DVD or the audio and video DVD, only the ATSI which is the navigation information is recorded in the ATS but the AOB which is the substantial portion of only the audio information is not recorded in the ATS. Therefore, all of the audio information which is reproduced from the video DVD provided with the audio navigation is the information within the audio play part (more precisely within the audio pack 43, refer to FIG. 1) of the VOB within the VTS 3.

Thus, the titles in the video DVD provided with the audio navigation are categorized into two. One category thereof is the ordinary title of the video DVD in case of reproducing it by the video DVD player (hereinafter, it is referred to as a "video title (VTT)"). Another category is the title to reproduce only the audio information of the audio play part recorded within the VOB by the audio DVD player (hereinafter, it is referred to as an "audio only title (AOTT)").

① In Case of Reproducing by the Audio DVD Player

In case of reproducing the video DVD provided with the audio navigation by the audio DVD player, the path to reproduce the audio only title (AOTT) is firstly explained. Since only the audio information recorded on the video DVD is to be reproduced, the AMG 202 is firstly referred to. The AMG 202 includes the AMGI (AMG Information) 240 which is the substantial portion of the managing information. The AMGI 240 includes: an AMGI management table 241 including the file size, the recording address etc., of the AMGI 240; an audio title (ATT) search pointer table 242; and an audio only title (AOTT) search pointer table 243. The audio title is the general name of the audio only title consisting of only the audio information and the AV title (AVTT) consisting of the audio information including the video information accompanied to it. Incidentally, the ATT is for a compatible player which can reproduce both of the audio DVD and the video DVD.

In case of the video DVD provided with the audio navigation, only the AOTT search pointer exists within the audio title (ATT) search pointer table of the AMG. Therefore, the content of the audio title (ATT) search pointer table 242 and the content of the audio only title (AOTT) search pointer table 243 are very different from each other.

The ATT search pointer table 242 includes: ATT search pointer information 244 including the information such as the number of the ATT search pointers; and a plurality of ATT search pointers 245. Incidentally, in FIG. 6, the abbreviation in a bracket within each ATT search pointer indicates the kind of the title corresponding to the pertinent search pointer for the sake of the explanation here. However, as mentioned before, in case of the video DVD provided with the audio navigation, the titles in all of the ATT search pointers are the AOTTs.

In the same manner, the AOTT search pointer table 243 includes: AOTT search pointer information 246 including the information such as the number of the AOTT search pointers etc.,; and a plurality of AOTT search pointers 247. Incidentally, in FIG. 6, the abbreviation in a bracket within each AOTT search pointer indicates the kind of the title corresponding to the pertinent search pointer for the sake of the explanation here. As a matter of course, the titles in all of the AOTT search pointers are the AOTTs.

The positions on the search pointer tables respectively of the title ATT and the title AOTT corresponding to the same work are the same to each other. The ATT search pointer on the ATT search pointer table 242 and the ATT search pointer on the AOTT search pointer table 243 are corresponding to each other.

The ATT search pointer 245 and the AOTT search pointer 247 indicate the APGC logically constituting the title which is the object thereof. More concretely, in this case, the title #11 indicated by the ATT search pointer #1 and the AOTT search pointer #1 is the AOTT title. Therefore, as this AOTT search pointer #1 specifies the ATS number in which the pertinent title is included and the title number within the ATS, the APGCI is specified within the ATSI 211 corresponding to the pertinent title. Thus, at the time of reproducing, as only the audio pack 43 of the audio play part by reproducing only the audio pack 43 within the VOB 11 in accordance with the APGCI specified by the AOTT search AOTT pointer, only the audio information is reproduced (refer to FIG. 6, the paths of "A1" and "A2").

② In Case of Reproducing by the Audio DVD Player

Next, in case of reproducing the video DVD provided with the audio navigation by the video DVD player, the path to reproduce the video title (VTT) is explained. Since the video DVD provided with the audio navigation is basically the video DVD, the VMG 2 is firstly referred to in order to reproduce the ordinary video title to reproduce the video information together with the audio information.

The VMG 2 includes the VMGI (VMG Information) 21 which is the substantial portion of the managing information. The VMGI 21 includes: a VMGI management table 211 including the file size, the recording address etc., of the VMGI 21; and a title (TT) search pointer table 212.

The TT search pointer table 212 includes: TT search pointer information 214 including the information such as the number of the TT search pointers; and a plurality of TT search pointers 215. Incidentally, in FIG. 6, the abbreviation in a bracket within each TT search pointer indicates the kind of the title corresponding to the pertinent search pointer for the sake of the explanation here. However, the titles in all of the TT search pointers on the video DVD are the VTTs.

The positions on the search pointer tables respectively of the title ATT and the title AOTT corresponding to the same work may not have any relationship to each other. It is possible to define the contents and the orders on the ATT search pointer table of the AMGI and the TT search pointer table of the VMGI independently from each other.

The TT search pointer 215 indicates the PGC logically constituting the title which is the object thereof. More concretely, in this case, the title #2 indicated by the TT search pointer #2 is the VTT title i.e., the title in which the audio information is to be reproduced together with the video information. Therefore, as this TT search pointer specifies the number of the VTS 3 and the title number within the VTS 3, the PGCI is specified within the VTSI 11 corresponding to the pertinent title. Thus, the video DVD player obtains this PGCI and reproduces the pertinent title as the video information with the audio information by use of the video pack, audio pack etc., within the VOB (refer to FIG. 6, the paths of "B1" and "B2").

Namely, at the time of reproducing the audio record information (object) within the same VOB 10, there exist two paths i.e., one method of reproducing the VOB 10 via the VMG and the VTSI as indicated by the paths "B1" and "B2" in FIG. 6 (in this case, the video information is also reproduced in due course), and another method of directly reproducing the VOB 10 not via the VTSI from the AMG and the AYSI as indicated by the paths "A1" and "A2" (in this case, only the audio information is reproduced).

Since it is possible to define the APGCI and the PGCI (the PGCI of the video) and define the cells included in these independently from each other, it is possible to change the composition of the work (the reproduction control for the work) between the case of only listening the sound and the case of reproducing it with the video image.

Figure 7:
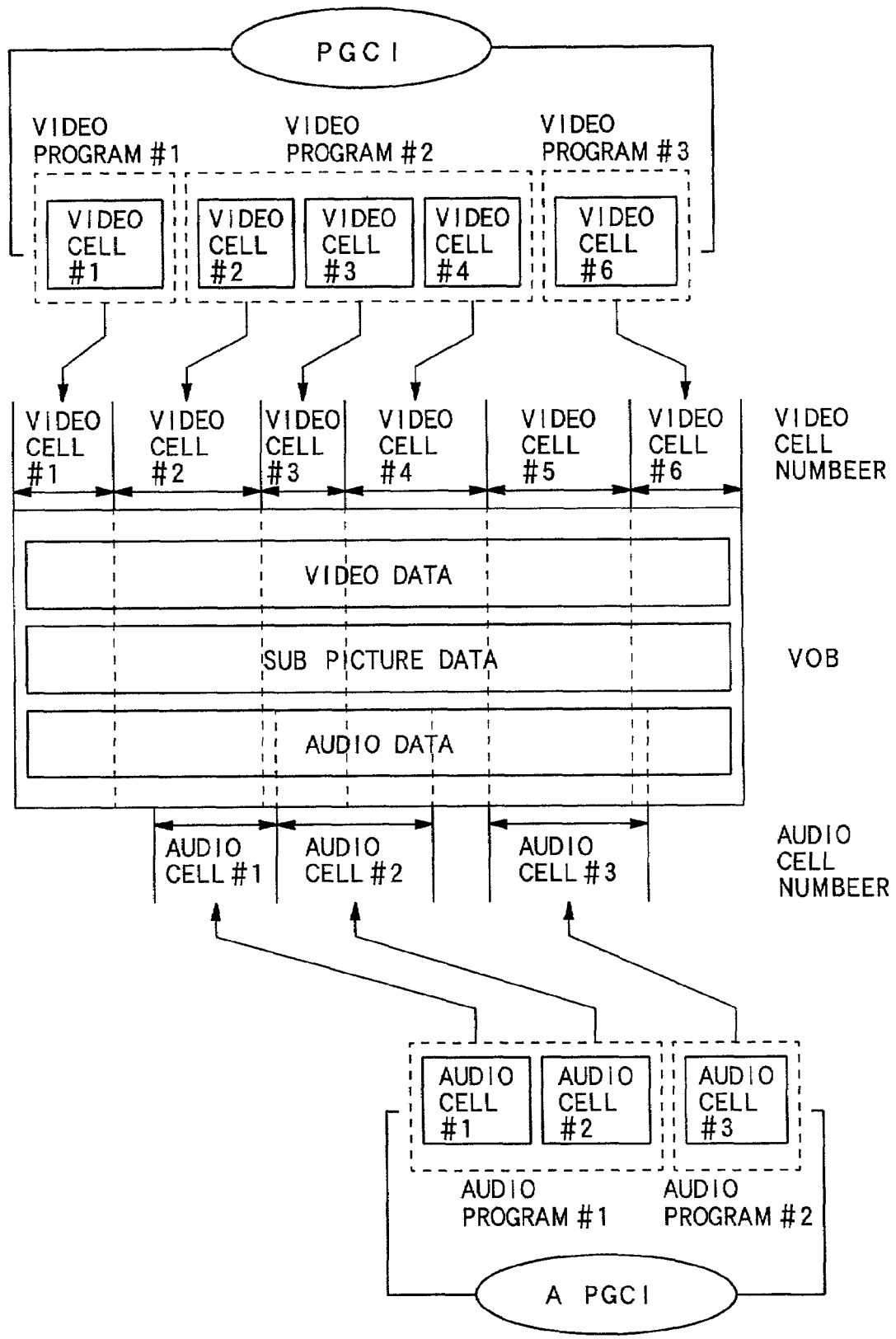
FIG. 7 is a diagram showing a concept of double management of the audio information in an embodiment of the present invention.

Next, this double management for the same object is further explained with reference to FIG. 7, mainly as for the physical structure of the object to be reproduced. FIG. 7 indicates a concept of the program in case of reproducing one VOB as the audio information with the video information in accordance with the PGCI and in case of reproducing the same one VOB as only the audio information of the audio play part in accordance with the APGCI. In the figure, the video data, the sub picture data and the audio data are included in the VOB.

In case of reproducing the VOB as the audio information with the video information, the reproduction control thereof is performed on the basis of he PGCI described within the VTSI. In the PGCI here, the VOB is divided into 6 pieces of video cells #1 to #6, the video program #1 is constructed by the video cell #1, the video program #2 is constructed by the video cells #2 to #4, and the video program #3 is constructed by the video cell #6. In case of reproducing the audio information with the video information such as the title of the VTT, the reproduction is performed in accordance with this kind of PGCI.

On the other hand, in case of reproducing only the audio information of the audio play part from the same one VOB, the reproduction is performed in accordance with the APGCI described in the ATSI. Each audio program prescribed by the APGCI is constructed by one or more than two of audio cells. Here, the audio cell may be prescribed to be different (independent) from the video cell with respect to the same one object (VOB). Off course, it is possible to prescribe them coincident to each other. In other words, the starting position, the ending position and the like of each audio cell may be set independently from any of the video cells. Further, the reproduction order of the audio cells prescribed by the APCGI may be defined independently from the reproduction order of the video cells prescribed by the PGCI.

In the example shown in FIG. 7, the audio program #1 is constructed by the audio cells #1 and #2, and the audio program #2 is constructed by the audio cell #3. The APGCI includes the information such as the record position, the reproduction order and so on of the audio cells included in these audio programs, so that the reproduction of the audio information is performed on the basis of the APGCI.

Next, the effect and advantage of prescribing the audio cell and the video cell independent from each other are explained.

(A) The actual reproduction time of the audio information can be managed by the unit of the audio frame.

In the recording format of the video DVD, it is assumed that the video information is recorded. Thus, the time management is performed by the frame unit of the video information. Thus, the reproduction time described to the video DVD (disc) itself is the reproduction time prescribed by the frame unit of the video information. Accordingly, in case of the NTSC, since one frame is not precisely equal to $\frac{1}{30}$ sec, the reproduction time prescribed by the frame unit is different from the reproduction time of actually reproducing the information. Namely, there is a problem that the reproduction time written on the disc with reference to the video frame and the performance time of actually reproducing it are not coincident to each other.

This is a fundamental problem of the video DVD format, and happens in case of reproducing the video information form the video DVD and in case of reproducing only the audio information from the video DVD.

In contrast, according to the present invention, since the audio cell and the video cell can be prescribed independently from each other, the time management of the audio information can be performed by a unit independent from the video frame, so that it can be performed independently from the time management of the video information.

More concretely, a system clock reference (SCR) which is the standard for the time management and the presentation time (PTM) which indicates the output time of the head data of the head audio frame within the audio pack are recorded at the header portion of each audio pack constituting the audio cell, so that the time management of the audio information is performed independently from the time management of the video information on the basis of these SCR and the PTM. Here, the audio frame is one group of the linear PCM data whose unit is $\frac{1}{600}$ sec for example.

The double management i.e., the possession of both the APGC and the PGCI means that the time information to manage the time by the unit different and independent from the video frame is described in the ATSI, for all of the audio programs (tracks) within the audio title.

The reproduction time of all of the tracks within the audio DVD may be described as the collective information in the AMG, the lead in area or the like. By this, the reproduction time, which is not based on the video frame, can be displayed on the basis of the time management based on the audio frame. Hence, the reproduction time written on the disc and the actual reproduction time can be coincident to each other. This is enabled by prescribing the audio cell and the video cell independently from each other.

Further, in case that the boundaries of the cells are coincident, the information in the APGCI and the positional information of the audio data with respect to the boundary of the cell are used together, so that the time management based on the audio frame becomes possible.

(B) The reproduction time of reproducing only the audio information can be precisely displayed.

In the video DVD format, a plurality of streams such as the video stream, the sub picture stream, the audio stream and the like are multiplexed and divided by a certain time unit to constitute the video object (VOB). The video stream within the video object consists of the video frames in an integer number, while the audio stream consists of the audio frames in the integer number. The presentation times of these streams are almost always different from each other, so that time management is performed on the basis of only the time of the video stream in case of the video DVD.

Further, there is no strict regulation between the time of the video data and the time of the audio data within the video object. Hence, although the time of the video data can be known since it is written on the disc as the time of each chapter, the time of the audio data within the same video object cannot be known since it is not written on the disc.

Therefore, in case of reproducing only the audio data within the video object, the actual reproduction time or the like cannot be known. More concretely, it is not possible to precisely know and display the total reproduction time within the disc or the reproduction time of each music composition, which is a problem.

This problem can be solved by prescribing the audio cell and the video cell independently from each other as aforementioned and performing the time management of the audio information and the time management of the video information independently from each other. Namely, in case of reproducing only the audio information within the video object, it is possible to precisely manage and display the reproduction time or the like on the basis of the time management information of the audio information.

(C) The logical division of the video subject and the logical division of the audio subject can be independently defined with respect to the same object.

Figure 8:
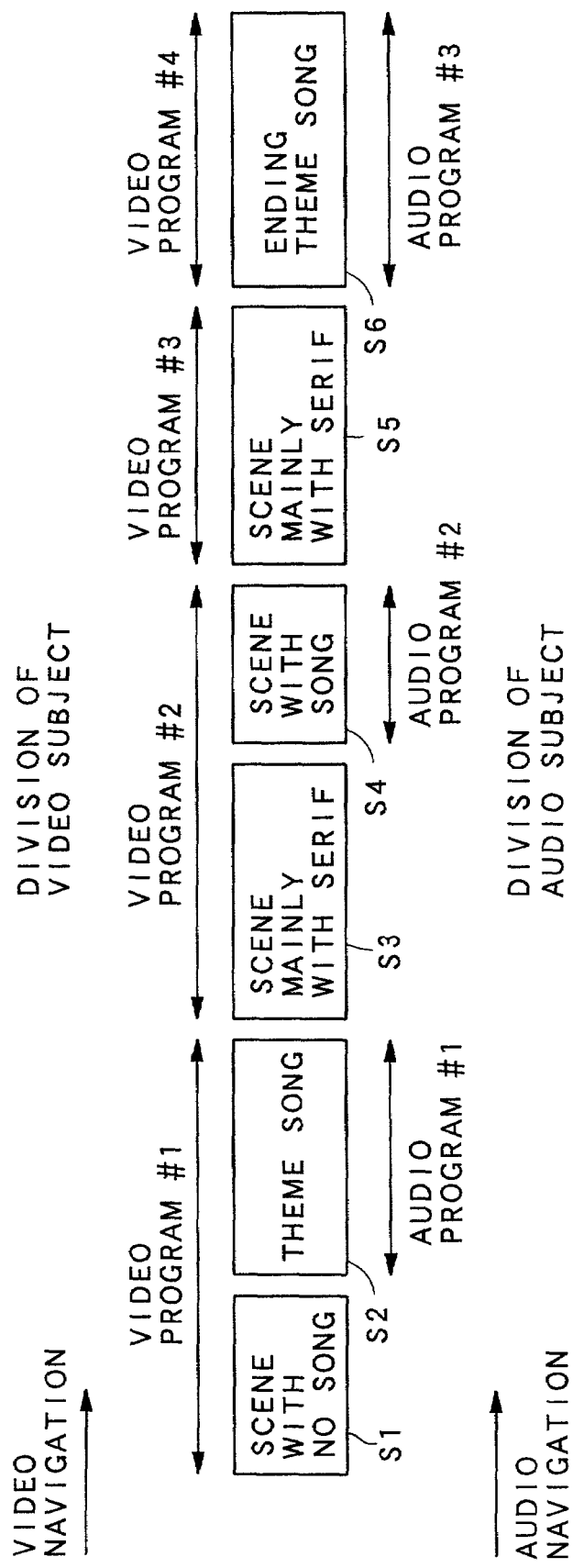
FIG. 8 is a diagram showing an example of a video object, which is an object of the double management.

The logical division in case of reproducing only the audio information within the video object is made different from that in case of reproducing the video information. For example, it is supposed that the scene shown in FIG. 8 is recorded as the video object. In the navigation information for the video, a video program #1 is constructed by a scene S1 with no sound and a scene S2 with a theme song, a video program #2 is constructed by a scene S3 with a line (i.e., a serif) and a scene S4 with a song, a video program #3 is constructed by a scene S5 with a line, and a video program #4 is constructed by a scene S6 with an ending theme song.

In contrast to this, supposing that only the audio information within the same object is reproduced, since it is not necessary to reproduce the scene S1 with no sound, the scenes S3 and S5 with the lines, it is desired to introduce a concept of a program (track) different from the video program.

In this example of FIG. 8, the scenes S2, S4 and S6 with the music are desired to be defined as the audio programs #1, #2 and #3 respectively.

Further, although it is not illustrated in the figure, it is supposed that 3 music compositions are included in a video program #n. In this cease, the division of the video program is set relatively large with considering the fact that it is a scene in a story. In contrast, in case of only listening to the music, it is desired to only listen to these 3 music compositions independently, and directly access to these 3 music compositions. Therefore, each of these 3 music compositions is defined as one audio program (track). In general, it is necessary to set the division finer in case of only listening to the music than in other cases.

On the other hand, in case of the video information, there may be a case that a story can be interactively selected by allowing the audience to select on a menu picture plane during the reproduction. In such a case, since it is not possible to interactively select it by just listening to the sound, it is necessary to exclude it from the audio programs.

In contrast to this, according to the present invention, since it is possible to prescribe the navigation information independently between the reproduction of the video information and the audio information (i.e., the ordinary video reproduction) and the reproduction of only the audio information, it is possible to prescribe the audio programs independently from the video program as shown in FIG. 8.

Further, it is possible to prescribe the reproduction order of the audio programs independently from the reproduction order of the video programs (it is also possible to exchange or swap the reproduction order of the audio programs shown in FIG. 8). Therefore, a highly flexible reproduction can be realized in which the unnecessary portion is excluded and the reproduction order is changed in case of reproducing only the audio information.

(D) The physical division of the video subject and the physical division of the audio subject can be defined independently from each other with respect to the same object.

As for the physical arrangement of the video information and the audio information recorded on the video DVD, the record position of one particular video data and the record position of the audio data corresponding to the reproduction time of the video data are different from each other.

Figure 9:
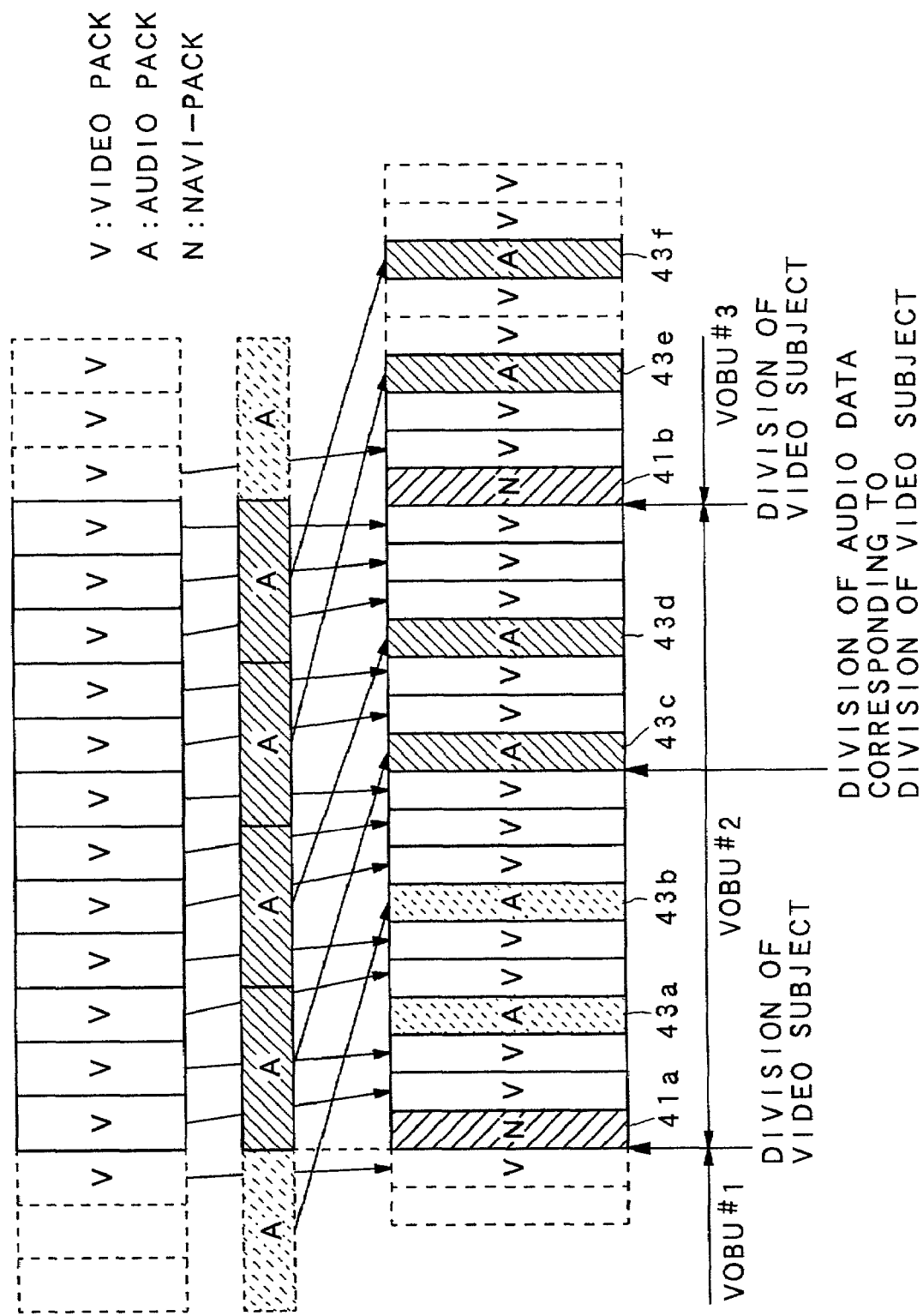
FIG. 9 is a diagram showing an example of a physical division of one object in the double management.

FIG. 9 shows this physical arrangement. In FIG. 9, an example of recording the navi-pack, the video pack and the audio pack within one VOBU is illustrated. In FIG. 9, the VOBU#2 is prescribed by the navi-packs 41a and 41b, between which a plurality of video packs and audio packs are multiplexed.

Here, in the reproduction of the video DVD based on the MPEG (Moving Picture Expert Group) standard, the video data is recorded as a plurality of video packs, and the audio packs including the corresponding audio data are recorded within a predetermined range from these video packs. At the time of reproduction, the video data of the video packs are temporarily stored in a buffer, and are outputted in synchronization with the corresponding audio data within the audio packs. Therefore, as shown in FIG. 9, there may happen such a case that the audio data corresponding to the video data within one VOB is recorded in another VOB next to this one VOB because of this shift of the record position. In the example of FIG. 9, the audio packs 43a and 43b included in the VOBU #2 correspond to the video data within the VOBU #1. Further, the audio packs 43e and 43f corresponding to the video data within the VOBU #2 are positioned within the next VOBU #3. Therefore, if one cell to reproduce only the information were prescribed on the basis of the VOBU of the video information, the audio information within the cell immediately before it would be reproduced.

In contrast to this, according to the present invention, the physical position of the audio cell and the physical position of the video cell can be independently defined. In the example of FIG. 9, the division of the audio cell is prescribed at a position immediately before the audio pack 43c which is the head of the audio information corresponding to the VOBU #2. Namely, the audio cells are defined independently from the video cells prescribed by the group of the VOBUs. By this, the audio data within a preceding VOBU can be prevented from being reproduced.

As described above in detail, in the present invention, the double management is performed with respect to the same object by virtue of the video and audio navigations. Further, in accompaniment with the double management, the physical and logical boundaries between the video cell and the audio cell can be independently prescribed.

Whether the physical and logical boundaries of the video cell defined by the PGCI and the audio cell defined by the APGCI are coincident or not coincident to each other, it is possible to freely combine the video and audio cells by the unit of the cell respectively. By this, it is possible to effectively reproduce the video information (accompanied by the audio sound) or reproduce only the audio information from the same object (VOBU).

In the above explanation, the case where the video DVD provided with the audio navigation is explained, the present invention can be applied to the audio and video DVD. Namely, as shown in FIG. 5, in case of the audio and video DVD, while the information is recorded by the video DVD format within the video area, the navigation information for reproducing the information in the video area and the navigation information for reproducing only the audio information are recorded in the ATT search pointer table and the AOTT search pointer table respectively in the AMG. Therefore, in case of reproducing the information in the video area by use of the navigation information in the AMG in the audio and video DVD, the present invention can be applied in the just same manner as the above explained video DVD provided with the audio navigation.

(5) Reproducing Apparatus

① Video DVD Player

Figure 10:
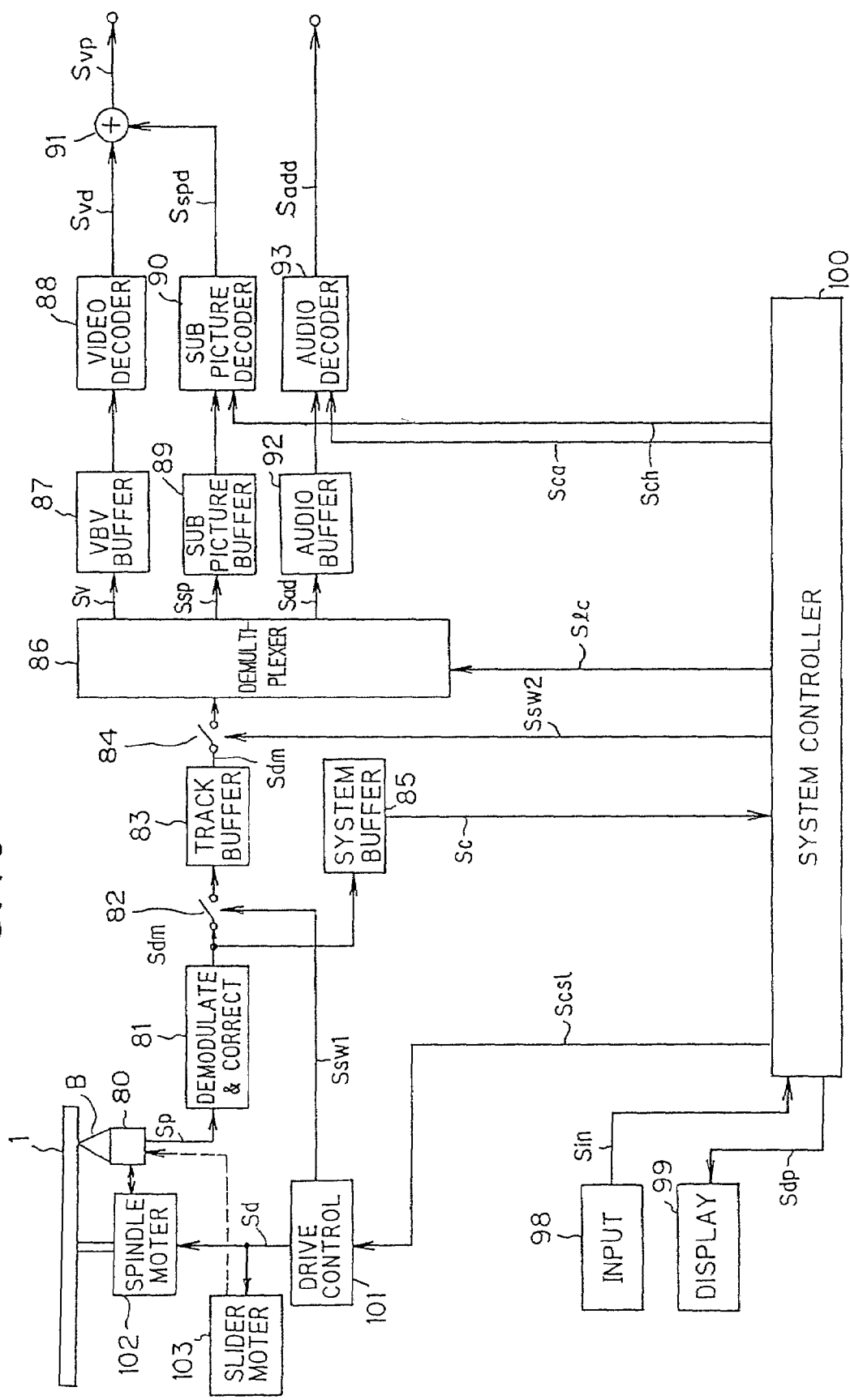
FIG. 10 is a block diagram of a video DVD player.

As shown in FIG. 10, a video DVD player as the present embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; an input unit 98; a display unit 99; a system controller 100; a drive controller 101; a spindle motor 102; and a slider motor 103. The construction shown in FIG. 10 only illustrates the portions related to the video and audio reproduction of the video DVD player. The description and the detailed explanation as for servo circuits to servo-control the optical pickup 80, the spindle motor 102, the slider motor 103 and the like are omitted since they are constructed in the same manner as the conventional arts.

Nextly, an overall operation of the present embodiment is explained.

The optical pickup 80 includes a laser diode, a polarization beam splitter, an objective lens, a photo-detector and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal Sp outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Ssw1 from the drive controller 101. When it is closed, the stream switch 82 passes therethrough the inputted demodulation signal Sdm as it is to the track buffer 83. When it is opened, the demodulation signal Sdm is not outputted therethrough, so that unnecessary or useless information (signal) is not inputted to the track buffer 83.

The track buffer 83, to which the demodulation signal Sdm is inputted, consists of a FIFO (First In First Out) memory, for example. The track buffer 83 temporarily stores the inputted demodulation signal Sdm, and continuously outputs the stored demodulation signal Sdm when the stream switch 84 is closed.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the management information (e.g. the VMG 2 etc.,) or the VTSI 11 of each VTS 3 which are detected firstly upon loading the DVD 1 and which are related to the whole information recorded on the DVD 1. Then, the system buffer 85 outputs the accumulated data as a control information Sc to the system controller 100, and temporarily stores the DSI data 51 for each navi-pack 41 during the reproduction, to output it also as the control information Sc to the system controller 100.

The demultiplexer 86, to which the demodulation signal Sdm is continuously inputted through the stream switch 84, separates the video data, the audio data, the sub picture data and the PCI data for each navi-pack 41 respectively from the inputted demodulation signal Sdm, and outputs them as a video signal Sv, a sub picture signal Ssp, an audio signal Sad and a PCI signal Spc respectively to the VBV buffer 87, the sub picture buffer 89 and the audio buffer 92.

The demultiplexer 86 extracts the pack header, the packet header and the like from each pack (including the audio pack 43), and each packet, and outputs the information included in them as the header signal Shd to the system controller 100.

The VBV buffer 87, to which the video signal Sv is inputted, consists of a FIFO memory, for example. The VBV buffer 87 temporarily stores the video signal Sv and outputs it to the video decoder 88. The VBV buffer 87 compensates the difference or fluctuation in the data amount between respective pictures of the video signal Sv compressed by the MPEG 2 method. Then, the video signal Sv in which the differences in the data amount are compensated, is outputted to the video decoder 88, and is decoded by the MPEG 2 method to be outputted as a decoded video signal Svd to the mixer 91.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture information included in the sub picture signal Ssp with the video information corresponding to the sub picture information, and to output it. Then, the sub picture signal Ssp synchronized with the video information is inputted to the sub picture decoder 90 and is decoded to be outputted as a decoded sub picture signal Sspd to the mixer 91.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to a display device such as a CRT (Cathode Ray Tube) device not illustrated.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, on the basis of the header control signal Shc outputted from the system controller 100, and delays the audio signal Sad in accordance with the output condition of the corresponding video information. Then, the audio signal Sad, which is time-adjusted to synchronize with the corresponding video information, is outputted to the audio decoder 93. Then, a reproducing process based on the linear PCM method is applied thereat to the audio signal Sad on the basis of the header control signal Shc, and it is outputted as a decoded audio signal Sadd to a speaker etc. not illustrated.

② Audio DVD Player

Figure 11:
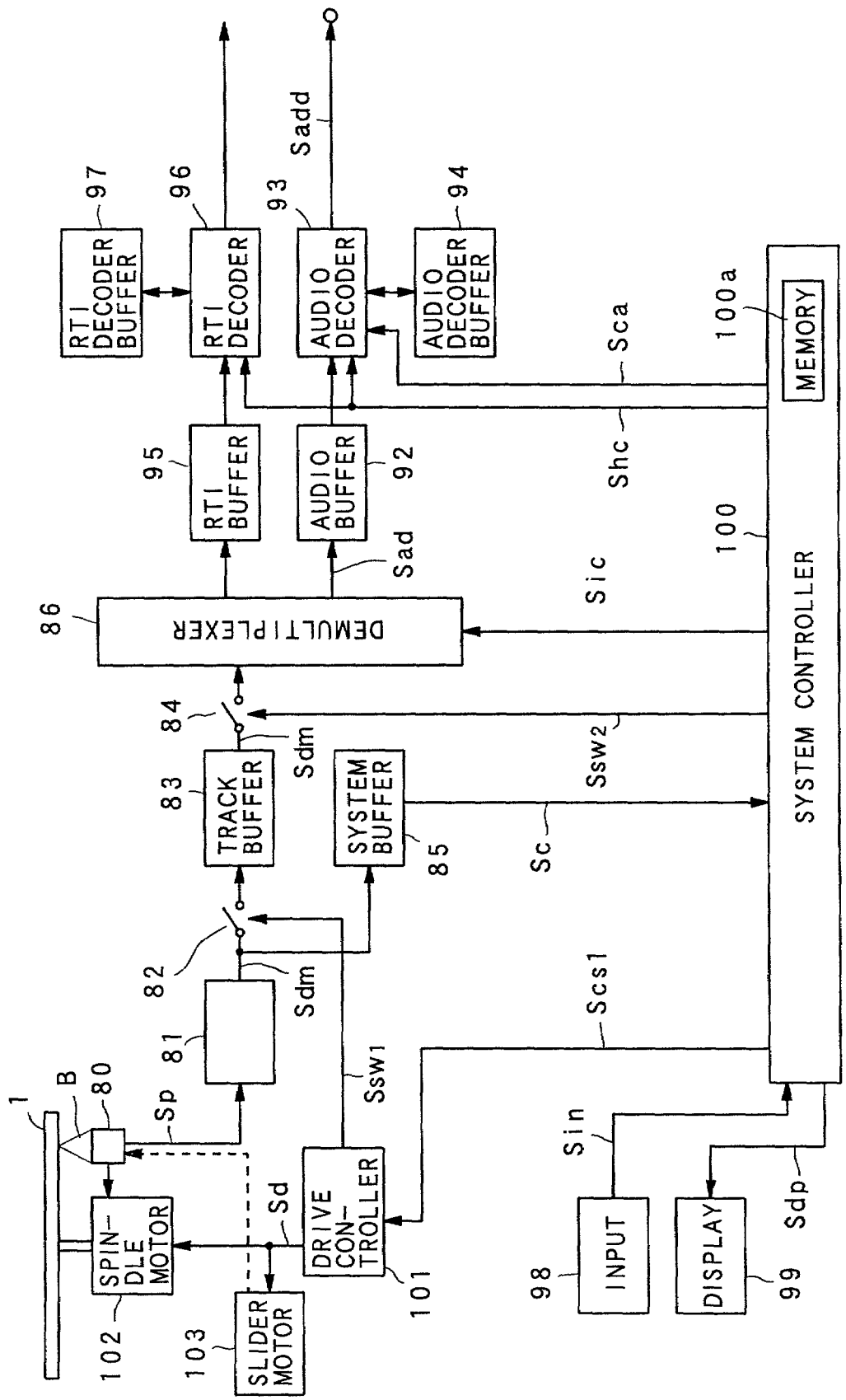
FIG. 11 is a block diagram of an audio DVD player.

Next, the aforementioned audio DVD player is explained with reference to FIG. 11. In FIG. 11, the same constitutional elements as those in FIG. 10 carry the same reference numerals, and the explanations thereof are omitted.

As shown in FIG. 11, the structure at the later stage of the demultiplexer 86 of the audio DVD player is different from that of the video DVD player in FIG. 10. However, the structure other than that of the audio DVD player in FIG. 11 is the same as that of the video DVD player in FIG. 10. Accordingly, the structure at the later stage of the demultiplexer 86 is explained here.

In FIG. 10, the demultiplexer 86, to which the demodulation signal Sdm is continuously inputted through the stream switch 84, extracts the audio information for each pack from the demodulation signal Sdm, and outputs it to the audio buffer 92 as the audio signal Sad.

The audio buffer 92, to which the audio signal Sad is inputted, consists of a FIFO memory, for example. The audio buffer 92 temporarily stores the audio signal Sad and outputs it to the audio decoder 93. Then, a reproducing process based on the linear PCM method is applied thereat to the audio signal Sad on the basis of the header control signal Shc, and it is outputted as a decoded audio signal Sadd to a speaker etc. not illustrated.

The real time information such as the real time text etc., is outputted from the demultiplexer 86 to the RTI buffer 95. The data temporarily stored in the RTI buffer 95 is outputted to the RTI decoder 96 on the basis of the control signal Shc outputted from the system controller 100, so that the lyrics etc., of the song is displayed on the display device which is not illustrated.

If a necessity to temporarily stop the audio sound (i.e., to pause) during the reproduction immediately after the access to a desired information etc., is detected, a pause signal Sca is outputted from the system controller 100 to the audio decoder 93. Then, the audio decoder 93 temporarily stops the output of the demodulated audio signal Sadd.

Next, the reproducing method in accordance with the aforementioned double management is explained with reference to FIG. 6 and FIG. 10. Now, it is assumed that the audio DVD player, to which the video DVD provided with the audio navigation is loaded, reproduces a plurality of audio titles described in the AMGI 240 in the AMG 202 shown in FIG. 6.

In the AMCI240, there is only the information related to the audio only title (AOTT). (In the ATT search pointer table, only the AOTT search pointer is described.) At first, the system controller 100 refers to the AOTT search pointer table in the AMGI 240. Since the AOTT search pointer #1 is described in the first title #1 as a matter of course, only the AOTT title i.e., only the audio information is the title to be reproduced. Therefore, the contents of the ATSI 211 which is the specified destination of the AOTT search pointer #1 is referred to (through the path A1 in FIG. 6), and the corresponding APGCI is obtained. Since the obtained APGCI includes the reproduction control information indicating the combination and the reproduction order of a plurality of cells in the VOB 10 etc., the specified audio packs are reproduced in the specified order according to the APGCI.

When the reproduction of the title #1 is finished, the system controller 100 refers s to the AOTT search pointer #2 of the title #2. After that, the same operations are repeated to continue the reproduction. When the title to be reproduce is finished, the system controller 100 finishes the reproducing process.

Next, it is assumed that the video DVD player, to which the video DVD provided with the audio navigation is loaded, reproduces a plurality of video titles described in the VMGI 21 in the VMG 2 shown in FIG. 6. At first, the system controller 100 refers to the TT search pointer table 214 in the VMGI 21. Since the TT search pointer #1 is the search pointer for the VTT which is the title to reproduce the audio information with the video information, the system controller 100 jumps to the VTSI 11 which is the destination specified by the pertinent TT search pointer #1 (through the path B1 in FIG. 6), so as to obtain the corresponding PGCI. Then, the cells in the VOB 10 is reproduced in the order according to the obtained PGCI (through the path B2 in FIG. 6). In this manner, the video information is reproduced. When the reproduction of the title #1 is finished, the system controller 100 refers to the TT search pointer #2 of the title #2. After that, the same operations are repeated to continue the reproduction. When the title to be reproduce is finished, the system controller 100 finishes the reproducing process.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. Hei. 9-328010 filed on Nov. 28, 1997 including the specification, claims, drawings and summary is incorporated herein by reference in its entirety.

What is claimed is:

1. A DVD information record medium having an audio zone and a video zone encoded with information, the information comprising:
   substantial information including video information and audio information which are related to each other;
   first reproduction control information to reproduce the video information and audio information out of the substantial information only for a first reproducing apparatus with video and audio reproduction ability;
   first management information only for the first reproducing apparatus;
   second reproduction control information to reproduce only the audio information out of the substantial information only for a second reproducing apparatus that is able to reproduce audio, but is not able to reproduce video; and
   second management information only for the second reproducing apparatus,
   wherein the substantial information, the first reproduction control information, and the first management information are recorded in the video zone, and the second reproduction control information and the second management information are recorded in the audio zone, and
   wherein the first reproduction control information is Video Title Set Information (VTSI), the first management information is Video Manager (VMG) information, the second reproduction control information is Audio Title Set Information (ATSI), and the second management information is Audio Manager (AMG) information.

2. A DVD information record medium according to claim 1, wherein the first reproduction control information and the second reproduction control information prescribe a reproduction of a same portion of the substantial information.

3. A DVD information record medium according to claim 1, wherein
   the first reproduction control information divides the substantial information into a plurality of first information units and prescribes a reproduction control of the first information units, and
   the second reproduction control information divides the substantial information into a plurality of second information units, which are different from the first information units, and prescribes a reproduction control of the second information units.

4. A DVD information record medium according to claim 1, wherein the second reproduction control information prescribes a reproduction of the substantial information in a reproduction order, which is different from that of the first reproduction control information, with respect to a same portion of the substantial information.

5. A DVD information record medium according to claim 1, further comprising another substantial information including only audio information recorded in the audio zone.

6. A DVD information record medium according to claim 1, wherein the first reproducing apparatus is a video player.

7. A DVD information record medium according to claim 1, wherein the second reproducing apparatus is an audio only player.

8. An information reproducing apparatus for reproducing a DVD information record medium having an audio zone and a video zone comprising: substantial information including video information and audio information which are related to each other; first reproduction control information to reproduce the video information and audio information out of the substantial information only for a first reproducing apparatus with video and audio reproduction ability; first management information only for the first reproducing apparatus; second reproduction control information to reproduce only the audio information out of the substantial information only for a second reproducing apparatus that is able to reproduce audio, but is not able to reproduce video; and second management information only for the second reproducing apparatus, wherein the substantial information, the first reproduction control information, and the first management information are recorded in the video zone, and the second reproduction control information and the second management information are recorded in the audio zone, and wherein the first reproduction control information is Video Title Set Information (VTSI), the first management information is Video Manager (VMG) information, the second reproduction control information is Audio Title Set Information (ATSI), and the second management information is Audio Manager (AMG) information,
   said information reproducing apparatus comprising:
   a reading device which reads the substantial information, the first reproduction control information and the second reproduction control information from said DVD information record medium; and
   a reproducing device which reproduces the substantial information in accordance with the first management information and the first reproduction control information when a reproduction of the video information and the audio information is instructed, and reproduces the substantial information in accordance with the second management information and the second reproduction control information when a reproduction of only the audio information is instructed.

9. An information reproducing apparatus according to claim 8, wherein the DVD information record medium further comprises another substantial information including only audio information recorded in the audio zone.

10. An information reproducing apparatus for reproducing a DVD information record medium having an audio zone and a video zone comprising: substantial information including video information and audio information which are related to each other; first reproduction control information to reproduce the video information and audio information out of the substantial information only for a first reproducing apparatus with video and audio reproduction ability; first management information only for the first reproducing apparatus; second reproduction control information to reproduce only the audio information out of the substantial information only for a second reproducing apparatus that is able to reproduce audio, but is not able to reproduce video; and second management information only for the second reproducing apparatus, wherein the substantial information, the first reproduction control information, and the first management information are recorded in the video zone, and the second reproduction control information and the second management information are recorded in the audio zone, and wherein the first reproduction control information is Video Title Set Information (VTSI), the first management information is Video Manager (VMG) information, the second reproduction control information is Audio Title Set Information (ATSI), and the second management information is Audio Manager (AMG) information,
   said information reproducing apparatus comprising:
   a reading device which reads the substantial information and the first reproduction control information from said DVD information record medium; and a reproducing device which reproduces the substantial information in accordance with the first management information and the first reproduction control information when a reproduction of the video information and the audio information is instructed.

11. An information reproducing apparatus according to claim 10, wherein the DVD information record medium further comprises another substantial information including only audio information recorded in the audio zone.

12. An information reproducing apparatus for reproducing a DVD information record medium having an audio zone and a video zone comprising: substantial information including video information and audio information which are related to each other; first reproduction control information to reproduce the video information and audio information out of the substantial information only for a first reproducing apparatus with video and audio reproduction ability; first management information only for the first reproducing apparatus; second reproduction control information to reproduce only the audio information out of the substantial information only for a second reproducing apparatus that is able to reproduce audio, but is not able to reproduce video; and second management information only for the second reproducing apparatus, wherein the substantial information, the first reproduction control information, and the first management information are recorded in the video zone, and the second reproduction control information and the second management information are recorded in the audio zone, and wherein the first reproduction control information is Video Title Set Information (VTSI), the first management information is Video Manager (VMG) information, the second reproduction control information is Audio Title Set Information (ATSI), and the second management information is Audio Manager (AMG) information, said information reproducing apparatus comprising:
a reading device which reads the substantial information and the second reproduction control information from said DVD information record medium; and
a reproducing device which reproduces the substantial information in accordance with the second management information and the second reproduction control information when a reproduction of only the audio information is instructed.

13. An information reproducing apparatus according to claim 12, wherein the DVD information record medium further comprises another substantial information including only audio information recorded in the audio zone.

14. An information reproducing method for reproducing a DVD information record medium having an audio zone and a video zone comprising: substantial information including video information and audio information which are related to each other; first reproduction control information to reproduce the video information and audio information out of the substantial information only for a first reproducing apparatus with video and audio reproduction ability; first management information only for the first reproducing apparatus; second reproduction control information to reproduce only the audio information out of the substantial information only for a second reproducing apparatus that is able to reproduce audio, but is not able to reproduce video; and second management information only for the second reproducing apparatus, wherein the substantial information, the first reproduction control information, and the first management information are recorded in the video zone, and the second reproduction control information and the second management information are recorded in the audio zone, and wherein the first reproduction control information is Video Title Set Information (VTSI), the first management information is Video Manager (VMG) information, the second reproduction control information is Audio Title Set Information (ATSI), and the second management information is Audio Manager (AMG) information, said information reproducing method comprising:
a reading process for reading the substantial information, the first reproduction control information and the second reproduction control information from said DVD information record medium; and
a reproducing process for reproducing the substantial information in accordance with the first management information and the first reproduction control information when a reproduction of the video information and the audio information is instructed, and reproducing the substantial information in accordance with the second management information and the second reproduction control information when a reproduction of only the audio information is instructed.

15. An information reproducing method according to claim 14, wherein the DVD information record medium further comprises another substantial information including only audio information recorded in the audio zone.

16. An information reproducing method for reproducing a DVD information record medium having an audio zone and a video zone comprising: substantial information including video information and audio information which are related to each other; first reproduction control information to reproduce the video information and audio information out of the substantial information only for a first reproducing apparatus with video and audio reproduction ability; first management information only for the first reproducing apparatus; second reproduction control information to reproduce only the audio information out of the substantial information only for a second reproducing apparatus that is able to reproduce audio, but is not able to reproduce video; and second management information only for the second reproducing apparatus, wherein the substantial information, the first reproduction control information, and the first management information are recorded in the video zone, and the second reproduction control information and the second management information are recorded in the audio zone, and wherein the first reproduction control information is Video Title Set Information (VTSI), the first management information is Video Manager (VMG) information, the second reproduction control information is Audio Title Set Information (ATSI), and the second management information is Audio Manager (AMG) information, said information reproducing method comprising:
a reading process for reading the substantial information and the first reproduction control information from said DVD information record medium; and
a reproducing process for reproducing the substantial information in accordance with the first management information and the first reproduction control information when a reproduction of the video information and the audio information is instructed.

17. An information reproducing method according to claim 16, wherein the DVD information record medium further comprises another substantial information including only audio information recorded in the audio zone.

18. An information reproducing method for reproducing a DVD information record medium having an audio zone and a video zone comprising: substantial information including video information and audio information which are related to each other; first reproduction control information to reproduce the video information and audio information out of the substantial information only for a first reproducing apparatus with video and audio reproduction ability; first management information only for the first reproducing apparatus; second reproduction control information to reproduce only the audio information out of the substantial information only for a second reproducing apparatus that is able to reproduce audio, but is not able to reproduce video; and second management information only for the second reproducing apparatus, wherein the substantial information, the first reproduction control information, and the first management information are recorded in the video zone, and the second reproduction control information and the second management information are recorded in the audio zone, and wherein the first reproduction control information is Video Title Set Information (VTSI), the first management information is Video Manager (VMG) information, the second reproduction control information is Audio Title Set Information (ATSI), and the second management information is Audio Manager (AMG) information, said information reproducing method comprising:

a reading process for reading the substantial information and the second reproduction control information from said DVD information record medium; and a reproducing process for reproducing the substantial information in accordance with the second management information and the second reproduction control information when a reproduction of only the audio information is instructed.

19. An information reproducing method according to claim 18, wherein the DVD information record medium further comprises another substantial information including only audio information recorded in the audio zone.

20. An information reproducing apparatus with video reproduction ability for reproducing a DVD information recording medium having an audio zone and a video zone comprising: substantial information including video information and audio information which are related to each other; first reproduction control information to reproduce the video information and audio information out of substantial information only for a first reproducing apparatus with video and audio reproduction ability; first management information only for the first reproducing apparatus; second reproduction control information to reproduce only the audio information out of the substantial information only for a second reproducing apparatus that is able to reproduce audio, but is not able to reproduce video; and second management information only for the second reproducing apparatus, wherein the substantial information, the first reproduction control information, and the first management information are recorded in the video zone, and the second reproduction control information and the second management information are recorded in the audio zone, and wherein the first reproduction control information is Video Title Set Information (VTSI), the first management information is Video Manager (VMG) information, the second reproduction control information is Audio Title Set Information (ATSI), and the second management information is Audio Manager (AMG) information, the information reproducing apparatus comprising:

a reading device which reads the first management information, the substantial information, and the first reproduction control information; and a reproduction device which reproduces the substantial information in accordance with the first management information and the first reproduction control information.

21. An information reproducing apparatus with audio only reproduction ability for reproducing a DVD information recording medium having an audio zone and a video zone comprising; substantial information including video information and audio information which are related to each other; first reproduction control information to reproduce the video information and audio information out of substantial information only for a first reproducing apparatus with video and audio reproduction ability; first management information only for the first reproducing apparatus; second reproduction control information to reproduce only the audio information out of the substantial information only for a second reproducing apparatus that is able to reproduce audio, but is not able to reproduce video; and second management information only for the second reproducing apparatus, wherein the substantial information, the first reproduction control information, and the first management information are recorded in the video zone, and the second reproduction control information and the second management information are recorded in the audio zone, and wherein the first reproduction control information is Video Title Set Information (VTSI), the first management information is Video Manager (VMG) information, the second reproduction control information is Audio Title Set Information (ATSI), and the second management information is Audio Manager (AMG) information, the information reproducing apparatus comprising:

a reading device which reads the second management information, the substantial information, and the second reproduction control information; and a reproduction device which reproduces the substantial information in accordance with the second management information and the second reproduction control information.

22. An information reproducing method with video reproduction ability for reproducing a DVD information recording medium having an audio zone and a video zone comprising: substantial information including video information and audio information which are related to each other; first reproduction control information to reproduce the video information and audio information out of substantial information only for a first reproducing apparatus with video and audio reproduction ability; first management information only for the first reproducing apparatus; second reproduction control information to reproduce only the audio information out of the substantial information only for a second reproducing apparatus that is able to reproduce audio, but is not able to reproduce video; and second management information only for the second reproducing apparatus, wherein the substantial information, the first reproduction control information, and the first management information are recorded in the video zone, and the second reproduction control information and the second management information are recorded in the audio zone, and wherein the first reproduction control information is Video Title Set Information (VTSI), the first management information is Video Manager (VMG) information, the second reproduction control information is Audio Title Set Information (ATSI), and the second management information is Audio Manager (AMG) information, the information reproducing method comprising:

a reading process for reading the first management information, the substantial information, and the first reproduction control information; and a reproduction process for reproducing the substantial information in accordance with the first management information and the first reproduction control information.

23. An information reproducing method with audio only reproduction ability for reproducing a DVD information recording medium having an audio zone and a video zone comprising; substantial information including video information and audio information which are related to each other; first reproduction control information to reproduce the video information and audio information out of substantial information only for a first reproducing apparatus with video and audio reproduction ability; first management information only for the first reproducing apparatus; second reproduction control information to reproduce only the audio information out of the substantial information only for a second reproducing apparatus that is able to reproduce audio, but is not able to reproduce video; and second management information only for the second reproducing apparatus, wherein the substantial information, the first reproduction control information, and the first management information are recorded in the video zone, and the second reproduction control information and the second management information are recorded in the audio zone, and wherein the first reproduction control information is Video Title Set Information (VTSI), the first management information is Video Manager (VMG) information, the second reproduction control information is Audio Title Set Information (ATSI), and the second management information is Audio Manager (AMG) information, the information reproducing method comprising:

a reading process for reading the second management information, the substantial information, and the second reproduction control information; and a reproduction process for reproducing the substantial information in accordance with the second management information and the second reproduction control information.

* * * * *